(12) United States Patent
Steiner

(10) Patent No.: US 12,553,714 B2
(45) Date of Patent: Feb. 17, 2026

(54) METHOD AND SYSTEM FOR OPTIMIZING USE OF COORDINATE MEASURING DEVICES

(71) Applicant: LEICA GEOSYSTEMS AG, Heerbrugg (CH)

(72) Inventor: Markus Steiner, Gränichen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 365 days.

(21) Appl. No.: 18/215,121

(22) Filed: Jun. 27, 2023

(65) Prior Publication Data
US 2023/0417545 A1    Dec. 28, 2023

(30) Foreign Application Priority Data
Jun. 28, 2022   (EP) .................................. 22181643

(51) Int. Cl.
*G01B 21/04*    (2006.01)
(52) U.S. Cl.
CPC .......... *G01B 21/04* (2013.01); *G01B 2210/58* (2013.01)
(58) Field of Classification Search
CPC .. G01B 21/04; G01B 2210/58; G01B 11/005; G05B 2219/32283; G05B 2219/37193; G05B 19/41865; G06F 17/10
See application file for complete search history.

(56) References Cited

U.S. PATENT DOCUMENTS

| 2021/0065006 A1 | 3/2021 | Bade et al. |
| 2021/0232989 A1* | 7/2021 | Rana .................... G05B 19/418 |
| 2023/0101185 A1* | 3/2023 | Astvatsaturov ....... H04W 4/029 |
| | | 701/100 |

FOREIGN PATENT DOCUMENTS

EP    3 842 946 A1    6/2021

OTHER PUBLICATIONS

Extended European Search Report dated Dec. 20, 2022 as received in Application No. 22181643.2.

* cited by examiner

*Primary Examiner* — Zhipeng Wang
(74) *Attorney, Agent, or Firm* — Maschoff Brennan

(57) ABSTRACT

A method for optimizing simultaneous use of a multitude of coordinate measuring devices at a multitude of locations, comprising: obtaining job information about a multitude of coordinate measuring jobs at the multitude of locations, the job information comprising the position of one or more objects, a time for performing the job, required capabilities of involved devices, and required certifications and/or calibrations for the involved devices; determining an actual position and a condition of each device, the condition comprising a measuring precision and a measuring speed, individual conditions of a plurality of components of the device, a maintenance status and a certification and/or calibration status; performing a job analysis involving the obtained job information and the determined positions and conditions; and performing, based on a result of the analysis, an assignment optimization for assigning at least a subset of the devices to the jobs.

15 Claims, 4 Drawing Sheets

METHOD AND SYSTEM FOR OPTIMIZING USE OF COORDINATE MEASURING DEVICES

BACKGROUND

The present disclosure pertains to a computer system and to a computer-implemented method for optimizing the use of a multitude of coordinate measuring devices. Particularly, the disclosure pertains to optimizing a spatial and temporal assignment of the devices to a plurality of coordinate measuring jobs.

Coordinate measuring devices, such as stationary coordinate measuring machines (CMM), portable articulated arm coordinate measuring machines (AACMM) or laser-based coordinate measuring devices including laser trackers, laser scanners and total stations are used in a wide variety of applications in quality management and quality assurance. Specialized companies may own a large number of these devices, a so-called "fleet". Such a fleet may consist of dozens or even several hundreds of different coordinate measuring devices that are in constant use, i.e. constantly either being used in the field, shipped from site to site or being subject to service and maintenance. To reduce the necessary fleet size, availability for use in the field should be maximized, whereas devices being idle should be avoided.

EP 3 842 946 A1 describes methods and systems for automatic identification of capabilities of electronic devices including coordinate measuring devices. It would be desirable to use identified capabilities of a multitude of coordinate measuring devices to optimize the use of the multitude of devices.

SUMMARY

It therefore an object of the present disclosure to provide an improved method and system for optimizing simultaneous use of a multitude of coordinate measuring devices at a multitude of locations.

It is a further object to provide such a method and system that allows automatically assigning the devices to the locations to perform measuring tasks.

It is a further object to provide such a method and system that allows determining individual device properties and characteristics and particularly allows assigning the devices based on the determined individual device properties and characteristics.

A first aspect relates to a computer-implemented method for optimizing simultaneous use of a multitude of coordinate measuring devices at a multitude of locations. The method comprises obtaining job information about a multitude of coordinate measuring jobs at the multitude of locations, each job involving one or more of the coordinate measuring devices and one or more objects to be measured. The job information comprises the position of the one or more objects to be measured, a time for performing the job (e.g. a deadline and/or timeframe), required capabilities of the involved coordinate measuring devices, comprising at least one of measuring precision and measuring speed, and required certifications and/or calibrations for the involved coordinate measuring devices. The method further comprises determining an actual position and a condition of each of the multitude of coordinate measuring devices. The condition comprises measuring capabilities of the device, comprising a measuring precision and/or speed, individual conditions of a plurality of components of the coordinate measuring device, comprising at least actuators and sensors, a maintenance status, e.g. including a kind and date of the last maintenance, and a certification and/or calibration status, e.g. including a kind and date of the last certification or calibration, respectively. The method further comprises performing a job analysis involving the obtained job information and the determined positions and conditions, and performing, based on a result of the analysis, an assignment optimization for assigning at least a subset of the coordinate measuring devices to the jobs. The assignment optimization includes at least an optimization regarding usage and maintenance for each of the multitude of measuring devices, and paths between the positions of the objects to be measured and the positions of the coordinate measuring devices.

According to some embodiments of the method, determining the actual position of a coordinate measuring device comprises receiving position data from the respective coordinate measuring device. In one embodiment, determining the actual position of a coordinate measuring device comprises requesting the position data from the respective coordinate measuring device. Requesting the position data may be event-triggered, e.g. triggered upon obtaining job information regarding a new job, or the position data may be requested and received in fixed or defined time intervals.

According to some embodiments of the method, determining the condition of a coordinate measuring device comprises obtaining condition data comprising information about an actual condition of the coordinate measuring device, for instance wherein obtaining the condition data comprises requesting the condition data from the respective coordinate measuring device. Requesting the condition data may be event-triggered, e.g. triggered upon obtaining job information regarding a new job, or the condition data may be requested and received in fixed or defined time intervals.

According to some embodiments of the method, determining the condition of a coordinate measuring device comprises predicting a condition of the coordinate measuring device for one or more points or periods in the future. Optionally, at least a subset of the one or more points or periods in the future coincide with the time of one or more of the coordinate measuring jobs.

According to some embodiments of the method, determining the condition of a coordinate measuring device comprises accessing a digital-twin database comprising individual digital twins for each of at least a subset of the coordinate measuring devices.

In some embodiments, each digital twin comprises information about the capabilities, the maintenance status, and the certification and/or calibration status of the individual device. In some embodiments, each digital twin comprises information about the individual conditions of the plurality of components of the individual device. For instance, the individual conditions of the components may comprise at least one of an overall usage time, an estimated wear, and a predicted demand for maintenance or replacement, e.g. wherein the demand is predicted based on an overall usage time and/or an estimated wear of the respective component.

In some embodiments, each digital twin is updated automatically, wherein updating a digital twin comprises sending, by the respective coordinate measuring device, condition data to a remote computational environment providing the digital-twin database. The remote computational environment may be or comprise a cloud. Sending the condition data may be event-triggered, or the condition data may be sent in fixed or defined time intervals. According to some embodiments of the method, the job analysis is performed by one or more algorithms using artificial intelligence and comprises solving an optimization problem including minimizing a cost function. The one or more algorithms for instance may comprise meta-heuristic-based algorithms, Monte-Carlo-based algorithms and/or generative algorithms. The one or more algorithms may be configured to perform the job analysis using at least one of Supervised Machine Learning, Deep Learning or Reinforcement Learning.

In some embodiments, the cost function is an L1 or L2 norm over the weighted sum of normalized contributions, the contributions including at least a subset of:
- a distance between a position of a coordinate measuring device and the job location;
- required time for moving a coordinate measuring device to the job location or for moving an object to be measured from the job location to the coordinate measuring device;
- required time for a coordinate measuring device to perform the job, particularly including required time for set-up of the coordinate measuring device;
- achievable accuracy for the measurement result; and
- expected wear of the coordinate measuring device when performing the job.

Constraints that are to be observed comprise at least a subset of:
- a minimum measurement accuracy of each assigned coordinate measuring device meets or exceeds a required measurement accuracy according to job specification; and
- qualified personnel is available at the job location to carry out set-up and measuring operations with each assigned coordinate measuring device.

According to some embodiments of the method, the job information comprises a required duration of the job, particularly a minimum or maximum duration.

According to some embodiments of the method, the optimization of usage involves a minimization of job duration based on the job information and on the capabilities, e.g. based on the required measuring precision and measuring speed and on the measuring precision and measuring speed of the coordinate measuring devices.

According to some embodiments of the method, the assignment optimization comprises assigning one or more coordinate measuring devices to unscheduled maintenance.

According to some embodiments of the method, the multitude of coordinate measuring devices comprise
- laser-based metrology devices, such as laser trackers, laser scanners or total stations,
- transportable coordinate measuring machines, such as portable articulated arm CMMs,
- stationary coordinate measuring machines, such as bridge-type or portal-type CMMs,
- structured-light scanners, and/or
- photogrammetric systems.

A second aspect pertains to a computer system for optimizing simultaneous use of a multitude of coordinate measuring devices at a multitude of locations, the system comprising one or more server computers, wherein the one or more server computers comprise memory for storing a digital-twin database, the digital-twin database comprising individual digital twins for the multitude of coordinate measuring devices, each individual digital twin comprising information about the respective individual coordinate measuring device, wherein the computer system is configured to perform the method according to the first aspect.

A third aspect pertains to a computer programme product comprising programme code which is stored on a machine-readable medium, or being embodied by an electromagnetic wave comprising a programme code segment, and having computer-executable instructions for performing, in particular when run on a computer system according to the second aspect, the method according to the first aspect.

BRIEF DESCRIPTION OF THE DRAWINGS

Aspects will be described in detail by referring to exemplary embodiments that are accompanied by figures, in which.

DETAILED DESCRIPTION

Figure 1:
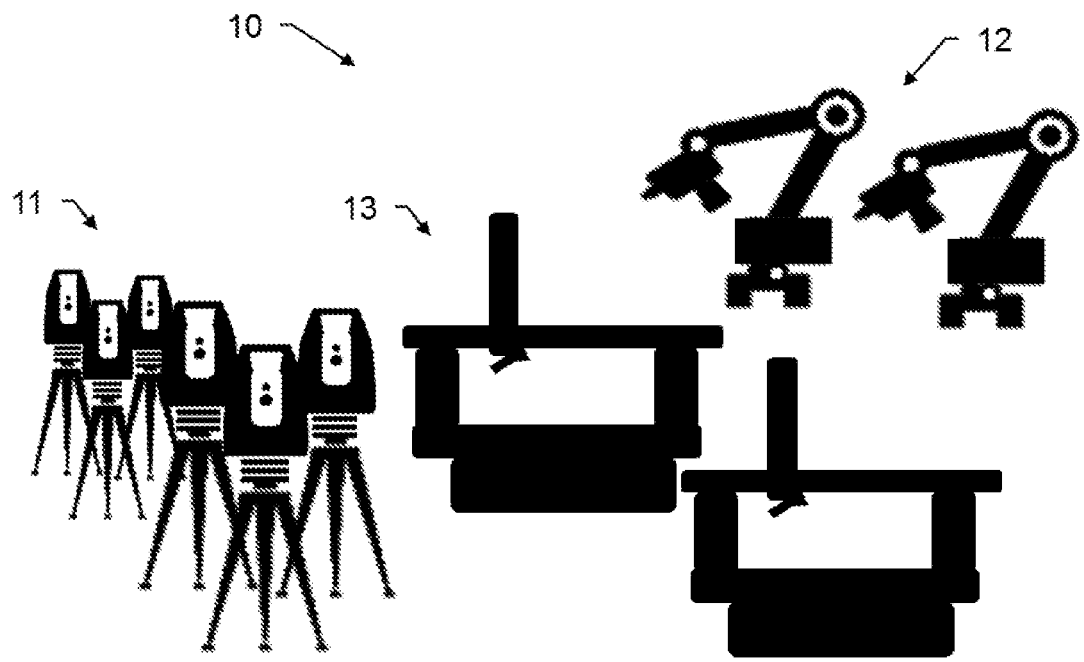
FIG. 1 shows an exemplary set of different coordinate measuring devices.

FIG. 1 shows an exemplary set 10 ("fleet") of different coordinate measuring devices 11, 12, 13. For instance, the fleet 10 may be located at a production facility or similar site where the devices are used e.g. for monitoring production processes or measuring produced workpieces for quality assurance. Alternatively, the fleet 10 may be located at a storage of a rental shop where the devices 11, 12, 13 are leased to end customers. Also, the devices of the fleet 10 may be provided at several different locations, spatially distributed over a large area. In the shown example, the fleet 10 comprises laser trackers 11, portable articulated arm CMMs 12 and stationary CMMs 13. The fleet 10 however may comprise also other kinds of coordinate measuring devices, e.g. reality capture devices, laser scanners or total stations as well as unmanned aerial or ground vehicles (UAV/UGV) comprising coordinate measuring equipment. Additionally or alternatively, the fleet 10 may also comprise devices like structured-light scanners or photogrammetric systems. Some of the devices of the fleet 10 may be easy to be transported, others not so easily and others may be completely stationary.

Figure 2:
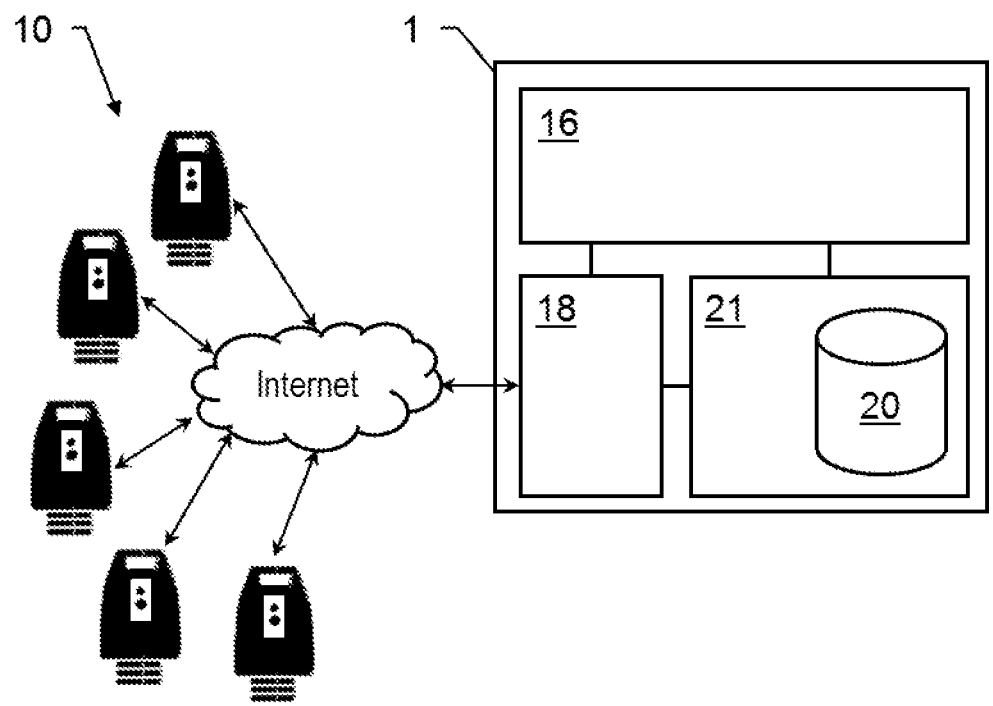
FIG. 2 shows a server computer as part of an exemplary embodiment of a computer system.

FIG. 2 shows an exemplary server computer 1 as a part of a computational environment, e.g. as a part of an exemplary embodiment of a computer system. The depicted server computer 1 comprises a processor 16, a communication unit 18 and a memory 21 that are operatively coupled with each other.

The memory 21 has stored a digital-twin database 20. The digital-twin database 20 comprises individual digital twins for a multitude of individual coordinate measuring devices. Each individual digital twin comprises individual information about the respective individual coordinate measuring device.

The communication unit 18 is configured to establish remote data connections via the Internet, e.g. with the coordinate measuring devices of the fleet 10 or with mobile devices of registered users of these devices.

According to the illustrative embodiment shown here, the server computer 1—either on its own or in combination with other server computers of a computer system—is configured:

to obtain job information about a multitude of coordinate measuring jobs at a multitude of locations, to determine, for each of a multitude of coordinate measuring devices, an actual position and a condition of the respective coordinate measuring device, to perform a job analysis involving the obtained job information and the determined positions and conditions, and to perform an assignment optimization for assigning the coordinate measuring devices to the jobs.

Each job involves one or more of the coordinate measuring devices, and the job information comprises the location and time of the job, required capabilities of the involved coordinate measuring devices, i.e. a measuring precision and/or speed, and required certifications and/or calibrations. The condition of a device comprises measuring capabilities of the device, i.e. the measuring precision and/or speed, individual conditions of a plurality of components of the device such as actuators and sensors, a maintenance status, and a certification and/or calibration status. The assignment optimization includes an optimization regarding usage, paths and maintenance for each of the multitude of measuring devices.

Figure 3:
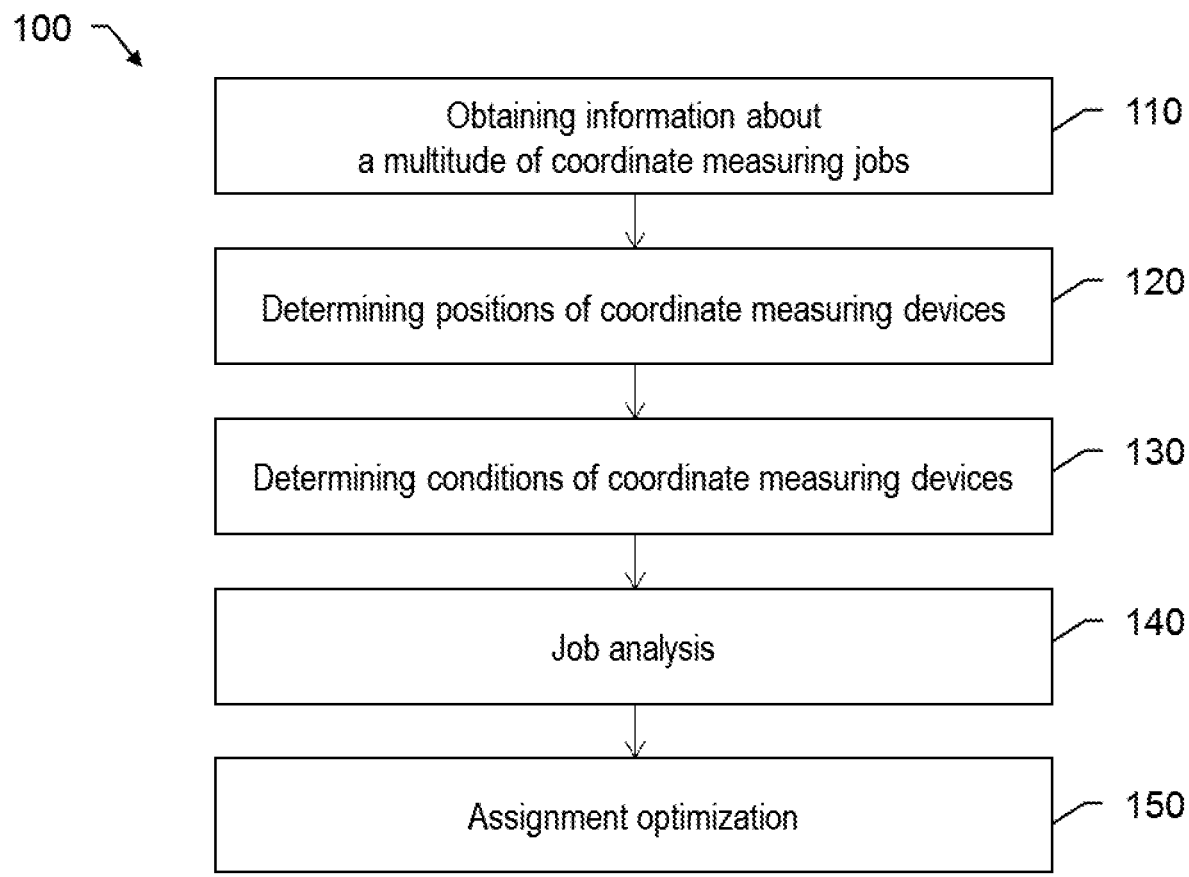
FIG. 3 shows a flow chart illustrating steps of an exemplary embodiment of a method.

FIG. 3 shows a flow chart illustrating an exemplary embodiment of a method 100 for optimizing simultaneous use of a multitude of coordinate measuring devices at a multitude of locations.

In a first step, job information about a multitude of coordinate measuring jobs at the multitude of locations is obtained 110. Each job involves one or more objects to be measured by one or more of the coordinate measuring devices. The obtained job information comprises the location of the object or objects to be measured and a time window for performing the job, capabilities of the involved coordinate measuring devices that are necessary for performing the job, such as a required measuring precision or a required measuring speed. The job information may also comprise information about whether the objects to be measured are transportable, e.g. to determine whether it is easier to move the object than to move the coordinate measuring device. For instance, the job information may be input manually by a consignor of the job or by the owner of the device fleet.

Then, for each of the coordinate measuring devices the actual position is determined 120. This may include receiving position data from the respective coordinate measuring device and determining the position based on the position data. For instance, some or all of the devices may comprise a positioning module, e.g. a GNSS module, that produces the position data. In some embodiments, the position data is sent from the devices upon a receiving a respective request. Sending this request may be triggered by an event, for instance by obtaining job information regarding a new job, or triggered in defined time intervals, for instance every hour. Alternatively or additionally, some or all devices may be programmed to send the position data without a request, for instance in defined time intervals.

A condition of each of the coordinate measuring devices is determined 130. For instance, the condition includes measuring capabilities of the device, e.g. at least a measuring precision and a measuring speed. The condition of a coordinate measuring device may also include individual conditions of a plurality of actuators, sensors and other components of the device. The condition may also include information about a maintenance, certification and/or calibration status, e.g. including a kind and date of the last maintenance, certification or calibration.

Each coordinate measuring device is unique to some extent. Even if some or all devices of a fleet are of the same kind, brand and type, the built-in components and their wear and tear may differ from one individual device to another. These differences may influence the achievable measuring speed or accuracies, as well as the need for service and maintenance. Therefore, knowing and considering these individual properties and characteristics may improve the overall assignments of devices to tasks.

Determining 130 the condition optionally may comprise obtaining condition data comprising information about an actual condition of the coordinate measuring device. This may include requesting the condition data from the respective coordinate measuring device, which may be event-triggered, e.g. triggered upon obtaining job information regarding a new job. Alternatively or additionally, the condition data may be requested and received in fixed or defined time intervals, or the devices may be configured to send the information without the need for a request.

Additionally or alternatively, some or all information regarding the condition may be obtained by accessing a digital-twin database which comprises individual digital twins for each coordinate measuring device. Each digital twin may be updated automatically, e.g. in fixed time intervals. This may include the coordinate measuring devices sending condition data to the digital-twin database.

Such an individual digital twin may comprise information about the capabilities, the maintenance certification and/or calibration status, and the individual conditions of the plurality of components of the individual device. The individual conditions of the components may comprise an overall usage time or an estimated wear of the component, or a predicted demand for maintenance or replacement of the component. For instance, the demand for maintenance or replacement may be predicted based on the overall usage time and/or the estimated wear of the respective component. The individual conditions of the components may also comprise further information, such as a lot number, a manufacturer, and a manufacturing date for each individual component. A demand for maintenance or replacement may then be predicted also based on these further information, for instance by monitoring component failures or maintenance reports of the same components in other devices and comparing the overall usage times or estimated wears of these components.

Determining 130 the condition of a coordinate measuring device optionally may comprise predicting a condition of the coordinate measuring device for one or more points or periods in the future. Preferably, to improve optimizing the assignment of the devices, these points or periods in the future may coincide with the time of one or more of the coordinate measuring jobs. Predicting the condition of the coordinate measuring device may also comprise predicting the conditions of each individual component of that device.

Based on the obtained 110 job information, on the determined 120 positions and on the determined conditions 130, a job analysis 140 is performed. For instance, for performing the job analysis 140, the system needs to know all the listed future measurement tasks, e.g. listed in a weekly schedule and comprising information about where and what should be measured and how exactly, and all the individual coordinate measuring devices of the fleet, e.g. information about the whereabouts of each device and functionalities that are likely to be available for each task.

The job analysis 140 may be performed using artificial intelligence (AI) to solve an optimization problem which includes minimizing a cost function. One or more algorithms, such as meta-heuristic-based algorithms, Monte-Carlo-based algorithms and/or generative algorithms may be used, particularly algorithms that are configured to perform the job analysis using at least one of Supervised Machine Learning, Deep Learning or Reinforcement Learning.

The cost function may be an L1 or L2 norm over the weighted sum of normalized contributions, wherein the contributions include a distance between a position of a coordinate measuring device and the job location, a required time for moving a coordinate measuring device to the objects to be measured (or vice versa), a required time for a coordinate measuring device to perform the job, for instance including required time for set-up of the coordinate measuring device at the job location, an achievable accuracy for the measurement result, and an expected wear of the coordinate measuring device when performing the job.

Constraints that are to be observed during the optimization may comprise e.g.:
that a minimum measurement accuracy of the assigned devices meets or exceeds a required measurement accuracy according to the job specification;
that no maintenance or recalibration of any of the assigned devices must be due while performing a job;
that a certification and calibration status of the assigned devices meet the requirements of the job specification;
that qualified personnel must be present at the job location to set-up and use the assigned devices;
that at least the coordinate measuring device or the object to be measured must be mobile, i.e. that stationary coordinate measuring devices cannot be used for measuring immobile objects.

Optionally, human feedback regarding the assignments may be received and used to re-train the optimization model. Some methods and systems for training AI structures are generally disclosed, e.g., in US 2021/0065006 A1.

Based on a result of the job analysis 140, an assignment optimization 150 is performed for assigning at least a subset of the coordinate measuring devices to the jobs, the assignment optimization including at least an optimization regarding usage, paths and maintenance.

The assignment optimization 150 may comprise assigning one or more coordinate measuring devices to unscheduled maintenance. For instance, such an assignment may be advantageous if there is free maintenance capacity, a need for maintenance of one or more of the components is predicted to occur in the near future and/or a scheduled maintenance collides with the necessity to perform a measurement job at the same time.

Figure 4:
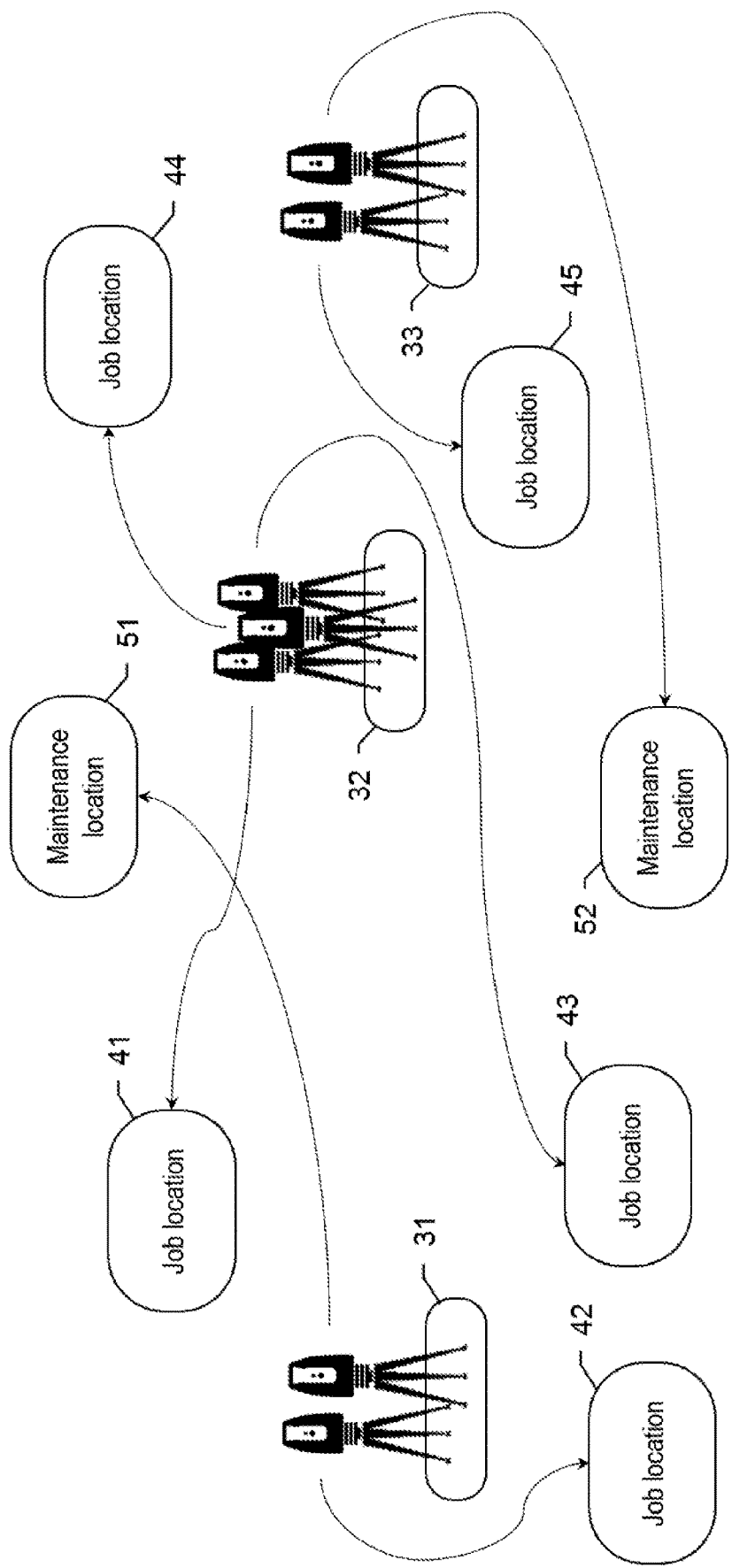
FIG. 4 illustrates a first example of an assignment of a plurality of coordinate measuring devices to a plurality of locations.

FIG. 4 illustrates a first example for an assignment a plurality of coordinate measuring devices to a plurality of coordinate measuring jobs. A fleet of seven coordinate measuring devices is distributed over three locations 31 to 33. They are to be assigned to jobs at five job locations 41 to 45. At the same time, some of the devices need maintenance which can be performed at one of the two maintenance locations 51, 52. A possible assignment is indicated by the arrows between each device and a job location or maintenance location. For instance, the assignment might be optimized (i.e. minimized) with regards to the travelled distance of all devices.

Figure 5:
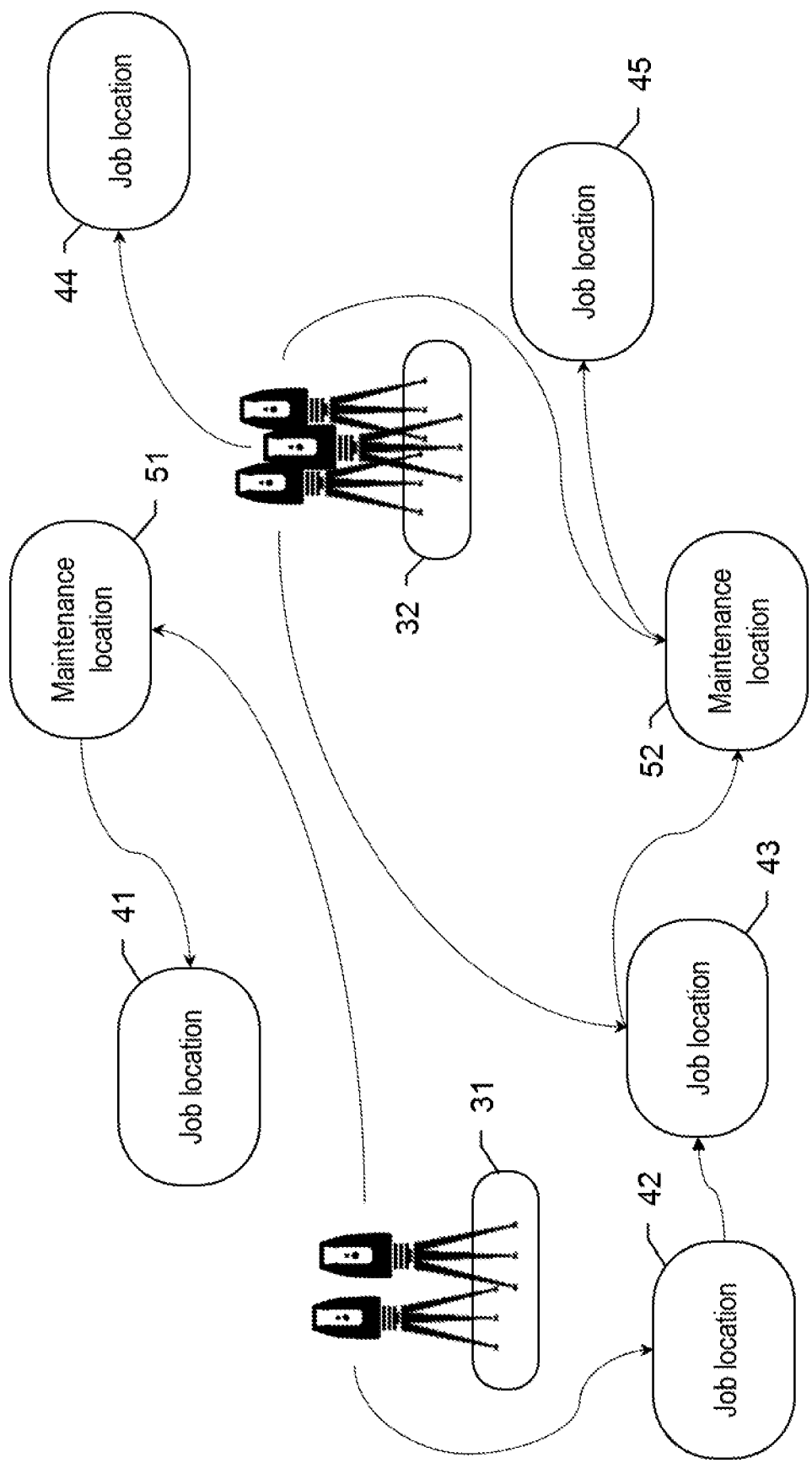
FIG. 5 illustrates a second example of an assignment of a plurality of coordinate measuring devices to a plurality of locations.

FIG. 5 illustrates a second example for an assignment a plurality of coordinate measuring devices to a plurality of coordinate measuring jobs. Here, a fleet of only five coordinate measuring devices is distributed over two locations 31 and 32. The number of jobs, job locations 41 to 45 and maintenance locations 51, 52 is the same as in the first example. Since some of the devices need maintenance to be performed at one of the two maintenance locations 51, 52, there are not enough devices for performing all jobs at once. For instance, the assignment might be optimized (i.e. minimized) with regards to all jobs being completed as soon as possible, with the constraint that no device is used when maintenance is due.

Thus, for instance, one device from the first location 31 is assigned for maintenance at maintenance location 51 right away. Since it is close to job location 41, and thus the travel time is short, the same device is assigned to perform the job at job location 41 after its maintenance is completed.

In the shown example, two devices at the second location 32 are close to needing maintenance. Since the jobs at job locations 42 and 45 involve less measuring time, i.e. can be finished more quickly, than those at job locations 43 and 44. Consequently, one of the two devices that are close to needing maintenance is assigned to maintenance location 52 before maintenance becomes due. Afterwards it is assigned to job location 45. The other one is first assigned to job location 43 and—before finishing the job—is reassigned to maintenance location 52 because maintenance has become due. The job at job location 43 is finished by another device which already has finished its job at job location 42.

Especially in the case of stationary devices, such as stationary CMM, instead of transporting the coordinate measuring device to the objects to be measured at a job location, the objects may be transported to the locations of the coordinate measuring devices.

Although aspects are illustrated above, partly with reference to some preferred embodiments, it must be understood that numerous modifications and combinations of different features of the embodiments can be made. All of these modifications lie within the scope of the appended claims. In particular, the described system may be configured to execute some or all of the described method steps, and the described method may utilize some or all of the described system components.

The invention claimed is:
1. A computer-implemented method for optimizing simultaneous use of a multitude of coordinate measuring devices at a multitude of locations, the method comprising:
obtaining job information about a multitude of coordinate measuring jobs at the multitude of locations, each job involving one or more of the coordinate measuring devices and one or more objects to be measured, the job information comprising:
the position of the one or more objects to be measured;
a time for performing the job, particularly comprising a deadline and/or a timeframe;
required capabilities of the involved coordinate measuring devices, the capabilities comprising at least one of measuring precision and measuring speed, and
required certifications and/or calibrations for the involved coordinate measuring devices,
determining, for each of the multitude of coordinate measuring devices, a current position and a current condition of the respective coordinate measuring device, wherein determining the current condition comprises, upon obtaining job information regarding a new job, requesting and receiving condition data from the respective coordinate measuring device, the condition data comprising information about the current condition of the coordinate measuring device, the current condition comprising:

measuring capabilities of the device, the measuring capabilities comprising at least a measuring precision and a measuring speed, current individual conditions of a plurality of actuators and sensors of the coordinate measuring device, a maintenance status, particularly including a kind and date of the last maintenance, and a certification and/or calibration status, particularly including a kind and date of the last certification or calibration, respectively, performing a job analysis involving the obtained job information and the determined positions and conditions, and performing, based on a result of the analysis, an assignment optimization for assigning at least a subset of the coordinate measuring devices to the jobs, the assignment optimization including at least an optimization regarding:

usage and maintenance for each of the multitude of measuring devices, and paths between the positions of the objects to be measured and the positions of the coordinate measuring devices.

2. The method according to claim 1, wherein determining the current position of a coordinate measuring device comprises receiving position data from the respective coordinate measuring device, wherein determining the current position of a coordinate measuring device comprises requesting the position data from the respective coordinate measuring device, wherein:

requesting the position data is event-triggered, particularly triggered upon obtaining job information regarding a new job; and/or the position data is requested and received in fixed or defined time intervals.

3. The method according to claim 1, wherein the condition data is requested and received in fixed or defined time intervals.

4. The method according to claim 1, wherein determining the condition of a coordinate measuring device comprises predicting a condition of the coordinate measuring device for one or more points or periods in the future, wherein at least a subset of the one or more points or periods in the future coincide with the time of one or more of the coordinate measuring jobs.

5. The method according to claim 1, wherein determining the condition of a coordinate measuring device comprises accessing a digital-twin database comprising individual digital twins for each of at least a subset of the coordinate measuring devices.

6. The method according to claim 5, wherein each digital twin comprises information about:

the capabilities, the maintenance status, and the certification and/or calibration status, of the individual device.

7. The method according to claim 5, wherein each digital twin comprises information about the individual conditions of the plurality of components of the individual device, particularly wherein the individual conditions of the components comprise at least one of:

an overall usage time, an estimated wear, and a predicted demand for maintenance or replacement, particularly wherein the demand is predicted based on an overall usage time and/or an estimated wear of the respective component.

8. The method according to claim 5, wherein each digital twin is updated automatically, wherein updating a digital twin comprises sending, by the respective coordinate measuring device, condition data to a remote computational environment providing the digital-twin database, wherein:

the remote computational environment is or comprises a cloud;

sending the condition data is event-triggered; and/or the condition data is sent in fixed or defined time intervals.

9. The method according to claim 1, wherein the job analysis is performed by one or more algorithms using artificial intelligence and comprises solving an optimization problem including minimizing a cost function, particularly wherein the one or more algorithms comprise meta-heuristic-based algorithms, Monte-Carlo-based algorithms and/or generative algorithms, and/or are configured to perform the job analysis using at least one of Supervised Machine Learning, Deep Learning or Reinforcement Learning.

10. The method according to claim 9, wherein the cost function is an L1 or L2 norm over the weighted sum of normalized contributions, the contributions including at least a subset of:

a distance between a position of a coordinate measuring device and the job location;

required time for moving a coordinate measuring device to the job location or for moving an object to be measured from the job location to the coordinate measuring device;

required time for a coordinate measuring device to perform the job, particularly including required time for set-up of the coordinate measuring device;

achievable accuracy for the measurement result; and expected wear of the coordinate measuring device when performing the job, wherein constraints that are to be observed comprise at least a subset of:

a minimum measurement accuracy of each assigned coordinate measuring device meets or exceeds a required measurement accuracy according to job specification; and qualified personnel is available at the job location to carry out set-up and measuring operations with each assigned coordinate measuring device.

11. The method according to claim 1, wherein:

the job information comprises a required duration of the job, particularly a minimum or maximum duration; and/or the optimization of usage involves a minimization of job duration based on the job information and on the capabilities, particularly based on the required measuring precision and measuring speed and on the measuring precision and measuring speed of the coordinate measuring devices.

12. The method according to claim 1, wherein the assignment optimization comprises assigning one or more coordinate measuring devices to unscheduled maintenance.

13. The method according to claim 1, wherein the multitude of coordinate measuring devices comprise:

laser-based metrology devices, particularly laser trackers, laser scanners or total stations, transportable coordinate measuring machines, particularly portable articulated arm CMMs, stationary coordinate measuring machines, particularly bridge-type or portal-type CMMs, structured-light scanners, and/or photogrammetric systems.

14. A computer system for optimizing simultaneous use of a multitude of coordinate measuring devices at a multitude of locations, the system comprising one or more server computers, wherein the one or more server computers comprise memory for storing a digital-twin database, the digital-twin database comprising individual digital twins for the multitude of coordinate measuring devices, each individual digital twin comprising information about the respective individual coordinate measuring device, wherein the computer system is configured to perform a method for optimizing simultaneous use of a multitude of coordinate measuring devices at a multitude of locations, the method comprising:

obtaining job information about a multitude of coordinate measuring jobs at the multitude of locations, each job involving one or more of the coordinate measuring devices and one or more objects to be measured, the job information comprising:

the position of the one or more objects to be measured;

a time for performing the job, particularly comprising a deadline and/or a timeframe;

required capabilities of the involved coordinate measuring devices, the capabilities comprising at least one of measuring precision and measuring speed, and required certifications and/or calibrations for the involved coordinate measuring devices, determining, for each of the multitude of coordinate measuring devices, a current position and a current condition of the respective coordinate measuring device, wherein determining the current condition comprises, upon obtaining job information regarding a new job, requesting and receiving condition data from the respective coordinate measuring device, the condition data comprising information about the current condition of the coordinate measuring device, the current condition comprising:

measuring capabilities of the device, the measuring capabilities comprising at least a measuring precision and a measuring speed, current individual conditions of a plurality of actuators and sensors of the coordinate measuring device, a maintenance status, particularly including a kind and date of the last maintenance, and a certification and/or calibration status, particularly including a kind and date of the last certification or calibration, respectively, performing a job analysis involving the obtained job information and the determined positions and conditions, and performing, based on a result of the analysis, an assignment optimization for assigning at least a subset of the coordinate measuring devices to the jobs, the assignment optimization including at least an optimization regarding:

usage and maintenance for each of the multitude of measuring devices, and paths between the positions of the objects to be measured and the positions of the coordinate measuring devices.

15. Computer program product comprising program code which is stored on a non-transitory machine-readable medium, and having computer-executable instructions for performing, when run on a computer system, a method for optimizing simultaneous use of a multitude of coordinate measuring devices at a multitude of locations, the method comprising:

obtaining job information about a multitude of coordinate measuring jobs at the multitude of locations, each job involving one or more of the coordinate measuring devices and one or more objects to be measured, the job information comprising:

the position of the one or more objects to be measured;

a time for performing the job, particularly comprising a deadline and/or a timeframe;

required capabilities of the involved coordinate measuring devices, the capabilities comprising at least one of measuring precision and measuring speed, and required certifications and/or calibrations for the involved coordinate measuring devices, determining, for each of the multitude of coordinate measuring devices, a current position and a current condition of the respective coordinate measuring device, wherein determining the current condition comprises, upon obtaining job information regarding a new job, requesting and receiving condition data from the respective coordinate measuring device, the condition data comprising information about the current condition of the coordinate measuring device, the current condition comprising:

measuring capabilities of the device, the measuring capabilities comprising at least a measuring precision and a measuring speed, current individual conditions of a plurality of actuators and sensors of the coordinate measuring device, a maintenance status, particularly including a kind and date of the last maintenance, and a certification and/or calibration status, particularly including a kind and date of the last certification or calibration, respectively, performing a job analysis involving the obtained job information and the determined positions and conditions, and performing, based on a result of the analysis, an assignment optimization for assigning at least a subset of the coordinate measuring devices to the jobs, the assignment optimization including at least an optimization regarding:

usage and maintenance for each of the multitude of measuring devices, and paths between the positions of the objects to be measured and the positions of the coordinate measuring devices.

* * * * *